United States Patent

[11] 3,632,996

[72] Inventors Thomas O. Paine
Administrator of the National Aeronautics and Space Administration with respect to an invention of;
Tage O. Anderson, Arcadia; William J. Hurd, La Canada, both of Calif.

[21] Appl. No. 21,508
[22] Filed May 14, 1970
[45] Patented Jan. 4, 1972

[54] DIGITAL QUASI-EXPONENTIAL FUNCTION GENERATOR
6 Claims, 5 Drawing Figs.

[52] U.S. Cl. .......... 235/92 DE, 235/92 R, 235/92 CC, 235/92 DM, 235/92 LG, 340/347 DA, 340/347 DD, 235/152
[51] Int. Cl. .......... G06m 3/00
[50] Field of Search .......... 235/92 MC, 92 DM, 92 LG, 92 CC, 92 CT, 92 DE, 197, 152; 340/347 DA, 347 DD

[56] References Cited

UNITED STATES PATENTS

| | | | |
|---|---|---|---|
| 3,327,100 | 6/1967 | Slavin | 235/92 MC |
| 2,921,740 | 1/1960 | Dobbins et al. | 235/197 |
| 3,015,815 | 1/1962 | Mann | 340/347 |
| 3,280,309 | 10/1966 | Villwock | 235/92 |
| 3,321,608 | 5/1967 | Sterling | 235/151.1 |

*Primary Examiner*—Daryl W. Cook
*Assistant Examiner*—Joseph M. Thesz, Jr.
*Attorneys*—J. H. Warden, Paul F. McCaul and G. T. McCoy

ABSTRACT: A quasi-exponential function generator comprising a multistage counter which is clocked at a rate which is a function of the count or value of the counter. The possible counts are divided into fields which are sensed and the clock rate is reduced by a factor of two, as the count changes from one field to a lower field. Each field is further divided into several subfields which are also detected to control the clock rate to vary from subfield to subfield.

TAGE O. ANDERSON
WILLIAM J. HURD
INVENTORS

BY Paul F. McCaul
J. H. Warden
ATTORNEYS

TAGE O. ANDERSON
WILLIAM J. HURD
*INVENTORS*

BY Paul F. McCaul
J. H. Warden
ATTORNEYS

TAGE O. ANDERSON
WILLIAM J. HURD
INVENTORS

BY Paul F. McCaul
J. H. Warden
ATTORNEYS

DIGITAL QUASI-EXPONENTIAL FUNCTION GENERATOR

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention generally relates to a digital function generator and, more particularly, to a digital quasi-exponential function generator.

2. Description of the Prior Art

There are a number of cases in system design in which it is necessary to produce an exponentially decaying function of time. For maximum flexibility it is desireable to be able to vary, such as by programming, the function's initial value and its time constant. For example, in one prior art data compression method, in which the value of the decaying function is compared to a value in a digital register, it is necessary to be able to program the initial value and the time constant of the function in order to select a desired data compression ratio.

In an analog system, an exponentially decaying time function can easily be obtained by using either a simple resistance-capacitance circuit or by means of an integrate and reset circuit. In such analog implementations physical analog switching circuitry would be required to control the function's initial value and/or its time constant. Such switching circuitry greatly increases the generator's overall complexity and cost. Also, in an analog system which requires frequency tuned circuits, it can be subject to drift instability and noise. Furthermore, analog implementations are often incompatible with digital systems.

In a digital system one way of implementing an exponential function generator would be by means of a digital low-pass filter which requires the use of adders and multipliers. Another possible implementation is to use a hybrid system with an integrate-reset circuit and an analog-to-digital (A/D) converter. However, either of the last-described implementations would be quite expensive. Furthermore, the use of an integrate-reset circuit would result in the usual disadvantages experienced with analog circuits, such as drift, instability and noise sensitivity.

OBJECTS AND SUMMARY OF THE INVENTION

It is a primary object of the present invention to provide a new digital circuit which is capable of generating a function which approximates, to a high degree of accuracy, an exponentially decaying function.

Another object of the present invention is to provide a relatively simple and highly reliable digital circuit for generating a function, which is a very accurate approximation of an exponentially decaying function, hereafter referred to as a quasi-exponential function.

A further object of the invention is to provide a reliable, simple digital quasi-exponential function generator.

Yet, a further object of the present invention is to provide a generator which digitally generates a quasi-exponential function whose initial value and its time constant can be varied very easily over wide dynamic ranges.

These and other objects of the present invention are achieved by providing a countdown counter with a clock rate which is varied in such a manner that the count or value in the counter is decremented approximately exponentially with time. The initial value in the counter is preset to any desired value to define the function's initial value. The function's time constant is chosen by selection of the basic clock frequency or clock rate of the counter. By changing the clock rate, the function's time can be varied over a wide dynamic range.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
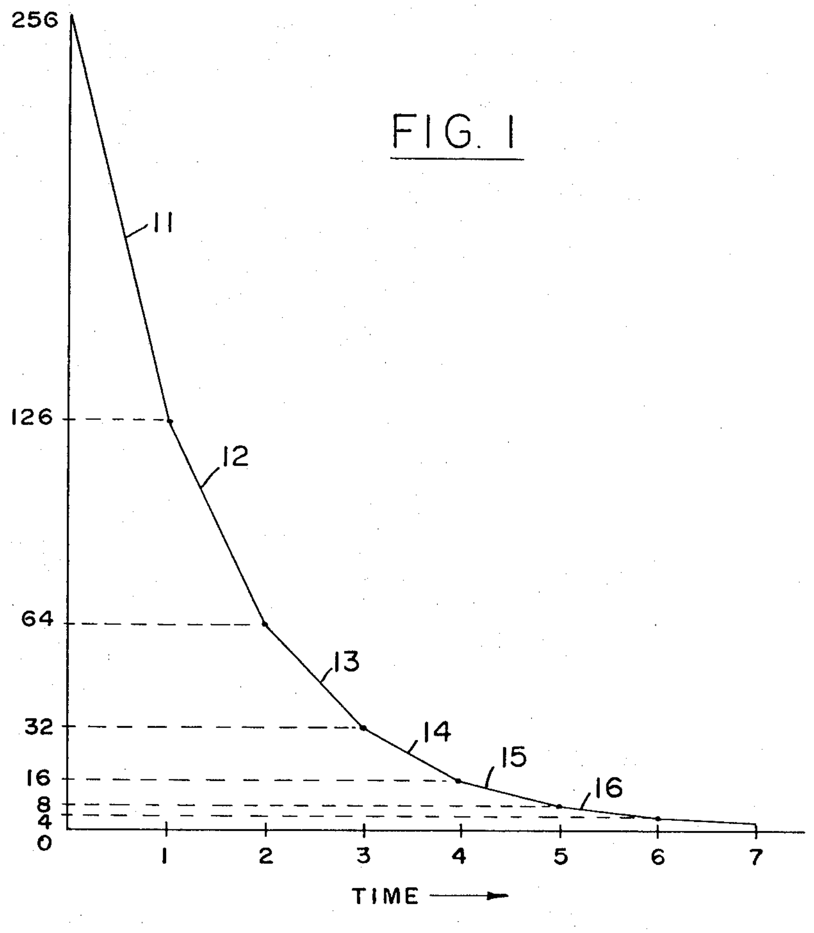
FIG. 1 is a diagram useful in explaining the basic operation of the present invention.

The present invention is based on the observation that in an exponential function the slope at any point in time is proportional to the amplitude at that time. This observation is used in implementing the present invention with a multistage binary counter which is clocked at a rate which is a function of the count or value in the counter. For explanatory reasons, the counter is assumed to be a countdown counter. The maximum count in the counter, represented by an all 1 state of the stages, represents full scale (FS). In practice, the rate of change of the count in the counter which is analogous to the slope of the function is made to be approximately proportional to the actual count in the counter. FIG. 1 to which reference is made is a diagram of the count in an eight-stage counter (FS=256) vs. time.

In accordance with the teachings of the present invention, in one embodiment the rate at which the counter is clocked is reduced by a factor of two each time the scale of the counter decreases by a factor of two. In an eight-bit counter in which FS=256, 1/2 scale=126, 1/4 scale=64, 1/8 scale=32, 1/16 scale=16, 1/32 scale=8, 1/64 scale=4 and 1/26 scale=2. All the counts between FS and 1/2 scale may be thought of as being in a first field, those between 1/2 scale and 1/4 scale in a second field, with the last field being defined by the counts between 7 and 4. Alternately stated, in an $n$ stage counter there are ($n$–2) fields where the first, second and $n^{th}$ fields include the counts from $$2^n \text{ to } \frac{2^2}{2^1}, \frac{2^n}{2^1}-1 \text{ to } \frac{2^n}{2^2} \text{ and } \frac{2^n}{2^{n-3}}-1 \text{ to } \frac{2^n}{2^{n-2}}$$

The various fields are designated in FIG. 1 by lines 11–16. In accordance with this invention, each time a change of field occurs in the countdown counter, the clock rate is divided by a factor of two (2). It should be pointed out that even though each field is half the length of the preceding field the time required to advance through each field is the same since the rate of the count change of each field is half the rate of count change of the preceding field.

It should be appreciated that each field of the counter may easily be determined by sensing the states of the various stages or bits of the counter. In the countdown counter, the count is in the first field when the most significant bit is true or a 1, the count is in the second field when the most significant bit is false, namely a 0, and the second most significant bit is a 1. Similarly, the counter is in any other field when the bit corresponding to that field is a 1 and all higher order bits are 0's.

Figure 2:
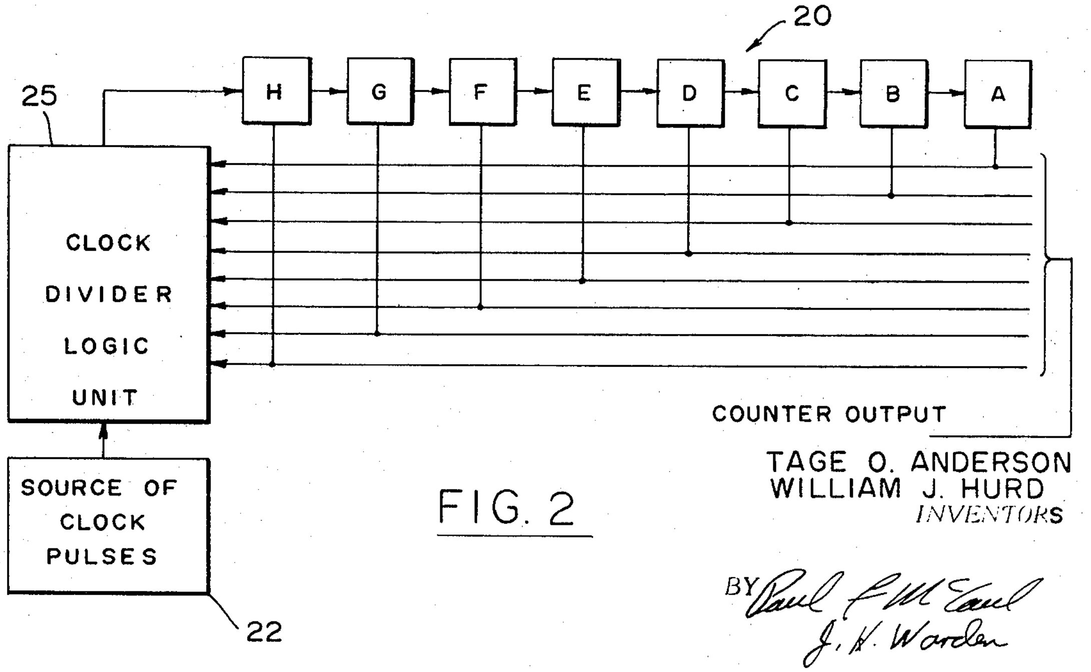
FIG. 2 is a block diagram of a basic embodiment of the invention.

The embodiment herebefore described in conjunction with FIG. 1 is conveniently implementable by an arrangement as shown in FIG. 2. Therein, a counter 20, comprising bits or states A–H is shown. Stage A is assumed to be the most significant. The counter 20 is assumed to be clocked by clock pulses from a source 22, through a clock divider logic unit 25. The outputs of the stages A–H, which are used to define the counter's value or count, are supplied to unit 25 in order to control the division or the rate at which the clock pulses from source 22 are supplied to the counter.

For the foregoing example, let it be assumed that when the counter is in the first field (between 256 and 126) the counter is clocked at a full selected rate. Then, when the count changes from 126 to 125, i.e., when the counter enters the second field which is sensed when stage A is a 0 and stage B is a 1, the clock rate is divided by a factor of two (2). This is represented by the slope of line 12 which is ½ the slope of line 11. Likewise, when the count changes from 64 to 63, i.e., when stages A and B are 0's and stage C is a 1, the clock rate is divided by four (4) as represented by slope 13.

From the foregoing it should be appreciated that the relatively simple arrangement of controlling the clock rate of a counter as a function of its count, the function as represented by lines 11–16 of FIG. 1 is produced. Various digital design techniques may be used in the implementation of unit 25 whose function is to divide the clock rate by $2^0$, $2^1$, $2^2$, etc. as a function of the field of the count in the counter 20. One such implementation will be described hereafter.

From a visual observation of FIG. 1, it is seen that the output function of the embodiment, shown in FIG. 2, is similar to a true exponential function. However, it only approximates such a function since the overall curve, defined by lines 11–16, has a few marked discrete changes in slope, rather than the continuous slope change which is characteristic of a true exponential function. Alternately stated, the number of changes in slope is small (five in FIG. 1) as compared with the total function range (FS=256). Consequently, the function produced by the embodiment of FIG. 2 may be thought of as a quasi-exponential function.

It has been discovered that the quasi-exponential function, produced by the present invention, may be made to be a closer approximation of a true exponential by dividing each field of the counter into several subfields and by further dividing the clock rate by a different number for each subfield, thus controlling the slope for the subfield. In one particular embodiment, each field is divided into three subfields, hereafter referred to as the upper, middle, and lower subfields. The upper and lower subfields cover the upper quarter and lower quarter, respectively of the field, while the middle subfield covers the second and third quarters of the field. The clock rate of the counter is controlled so that the relative slopes of the three subfields are 1/2, 1/3 and 1/4, respectively. This is accomplished by dividing the clock rate by 2, 3 or 4 for the three subfields of each field, irrespective of the division of clock rate for the particular field. Thus, assuming a selected basic clock rate, during the upper subfield of the first field the clock rate is divided by 2. It is divided by 3 and 4, respectively during the middle and lower subfields of the first field. Then, when the second field is entered, the clock rate is divided by 2 for the second field, and, in addition, it is divided by 2, 3 and 4 during the upper, middle and lower subfields, respectively of the second field.

Figures 3A, 3B:
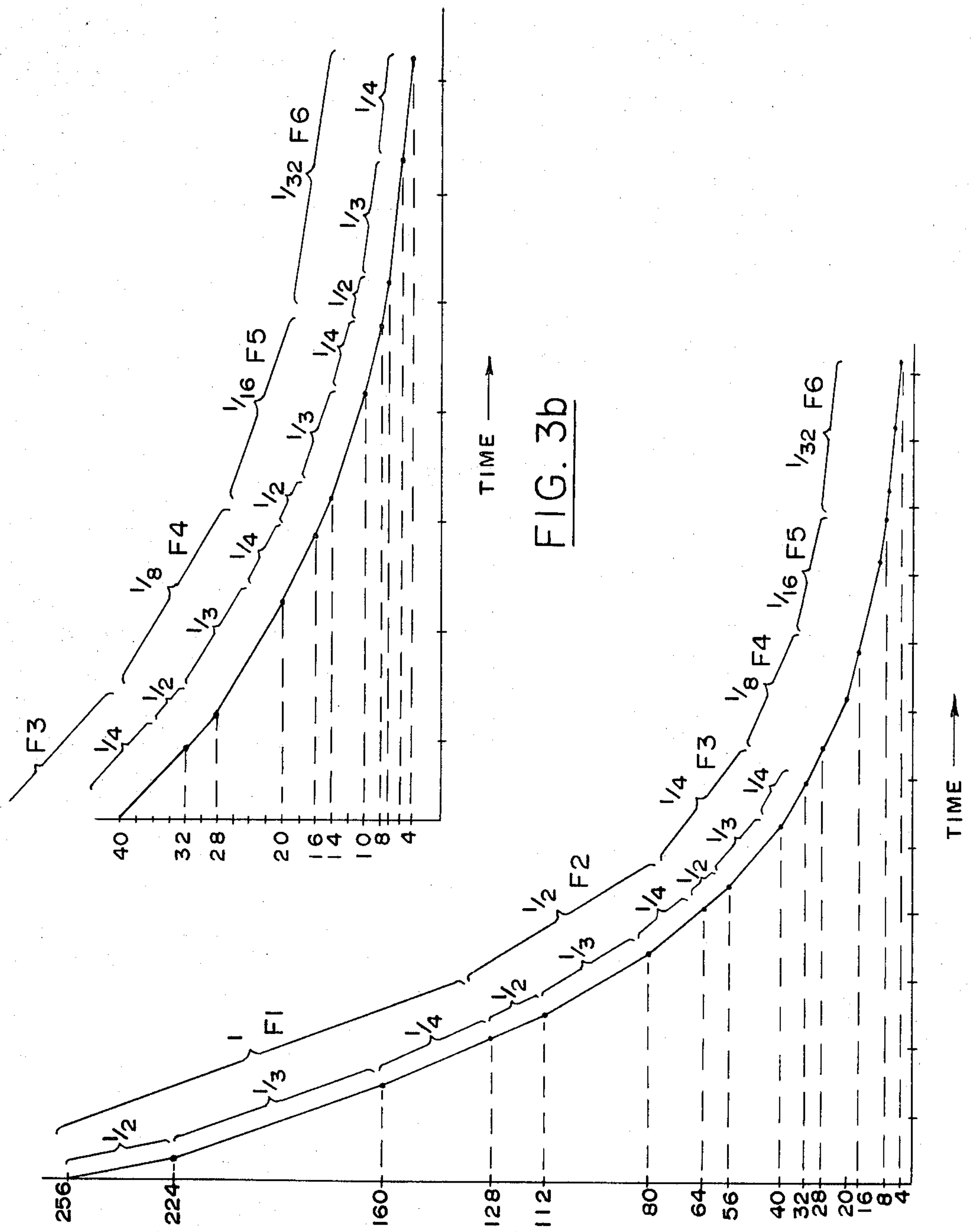
FIG. 3*a* and 3*b* are diagrams useful in explaining the operation of another embodiment of the invention.

The effect of such an arrangement on the output function of the counter is diagrammed in FIGS. **3*a* and 3*b*. Therein, the clock rate division for the fields, designated F1–F6, and the divisions for the three subfields of each field are indicated by the various fractions. It is apparent from FIGS. 3*a* and 3*b* that as a result of the change of slopes of the various subfields of each field, a much closer approximation to a true exponential function is achieved, since the sudden slope changes by a factor of 2, which are seen in FIG. 1**, are practically eliminated.

It should be stressed that the novelty of the present invention resides in the division of each field, regardless of its length into an equal number (such as 3) of subfields, with equal relative lengths within each field. Also, the relative slopes of the three subfields within each field are the same. Consequently, a simple single arrangement may be used to produce the subfields for all the fields.

Figure 4:
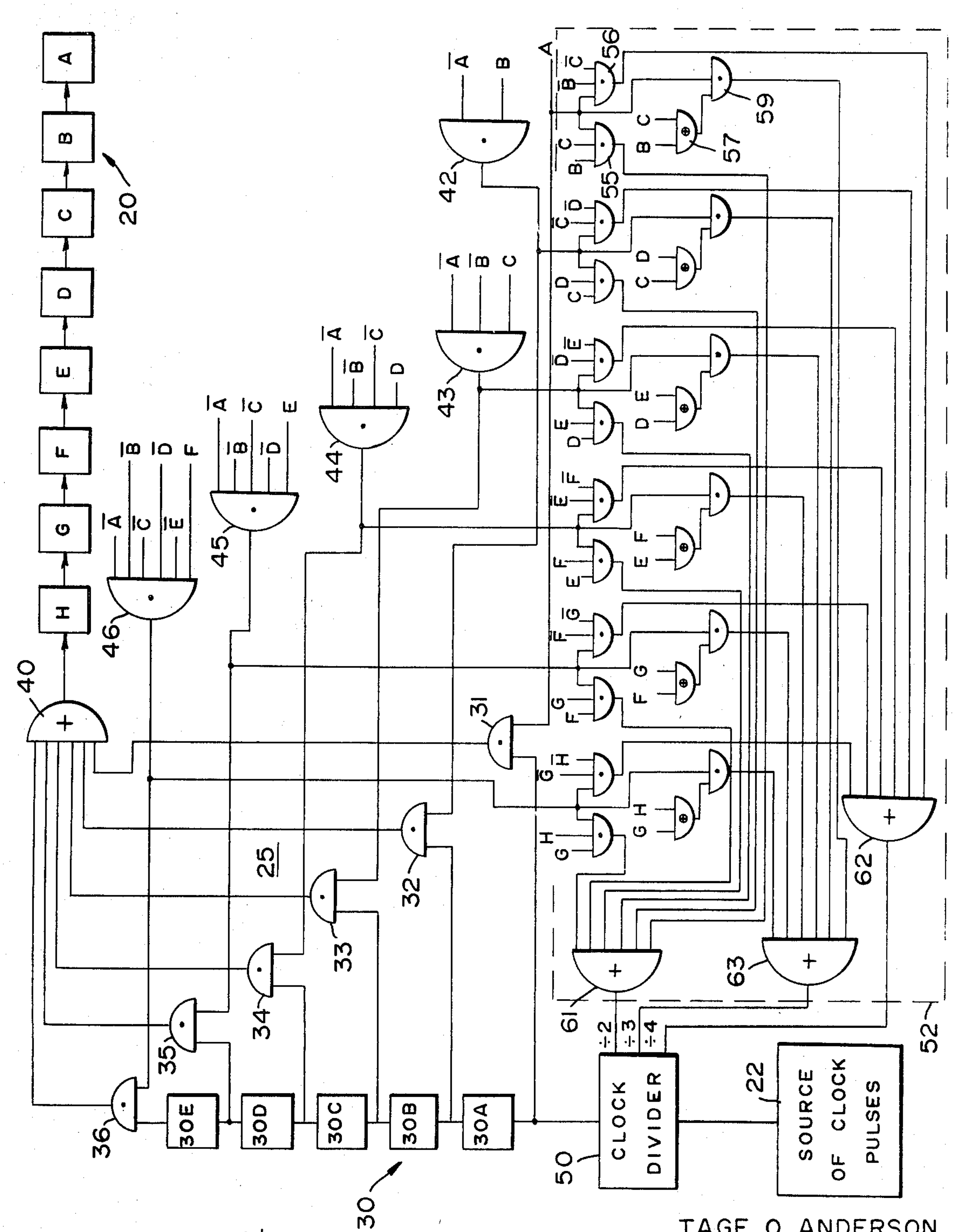
FIG. 4 is a complete block and schematic diagram of an embodiment, described in FIG. 3.

Attention is now directed to FIG. 4, which is a combination block and logic diagram of the embodiment of the invention in which each field is clocked at 1/2 the rate of a preceding field and the relative slopes of three subfields of each field are clocked at 1/2, 1/3 and 1/4 of the basic clock rate. In FIG. 4, elements like those previously described are designated by like numerals. In this figure, the clock divider logic unit 25 is shown comprising a five-stage or bit counter 30 consisting of stages 30A–30E, six two-input AND-gates 31–36, a six-input OR-gate 40, and five AND-gates 42–46 with two through six inputs, respectively. Except for the connection between counter 20 and the output of gate 40 which represents the counter's clock, the connections between the counter 20 and the unit 25 are purposely deleted to simply the diagram. In the diagram, a terminal designated by a counter stage designation, such as A, is assumed to be true or a 1 when the stage is a 1, while the conventional complement notation, such as A, is used to designate a terminal at a true or 1 level when the corresponding stage is false or a 0. The embodiment also includes an additional clock divider 50 which is interposed between source 22 and unit 25. It is the function of divider 50 to divide the clock rate by 2, 3 or 4 depending on the detected subfield. A multigate logic unit 52 detects the various subfields of all the fields to control the division, performed by divider 50.

The operation of the logic unit 25 will now be explained. From the foregoing description it should be appreciated that when counter 20 is in the first field, stage A is a 1. Consequently, gate 31 is enabled, thereby enabling gate 40 by each clock pulse from unit 50. When the counter is in the second field $\bar{A}$=1 and B=1. Consequently, gate 43 is enabled, thereby enabling gate 32 each time the output of stage 30A is a 1, which occurs at 1/2 the rate of the clock pulses from divider 50. As a result, when the counter 20 is in the second field the clocking rate is one-half the rate at the first field. Similarly, gate 43 and 33 and stage 30B control the clock rate to be half the rate at the preceding field, etc.

As seen from FIG. 4, the logic unit 52 includes an identical logic arrangement for each field. The function of the arrangement is to sense each of the three subfields of its associated field. Each arrangement is shown including two three-input AND-gates 55 and 56, a single Exclusive-OR-gate 57, and a two-input AND-gate 59. Each of gates 55, 56 and 59 of the arrangement associated with the first field has one input connected to stage A, while the same three gates of the arrangement, associated with the other five fields, are connected to the outputs of gates 42–46. The performance of each logic arrangement may best be explained by referring to the one associated with the first field, i.e., when A=1. When the counter 20 is in the top quarter of the first field A=1, B=1 and C=1. Thus, AND-gate 55 is enabled. Its output, as well as all the outputs of gates 55 of the other arrangements, are connected to an OR-gate 61 which when enabled causes divider 50 to divide the clock rate by 2. Thus, when the counter is in the upper subfield of the first field, gate 55 is enabled, enabling gate 61 to cause divider 50 to divide the clock rate by 2.

When the counter 20 is in the lower subfield of the first field A=1, B=0, and C=0. Consequently, gate 56 is enabled, enabling OR-gate 62 to cause divider 50 to divide the clock rate by 4. When the counter is in the middle subfield of the first field at any given time one of B and C is a 1 while the other is a 0. Consequently, during the middle subfield the output of gate 57 which is supplied to AND-gate 59 is true or a 1. Since during the first field A is a 1, AND-gate 59 is enabled. The latter is connected to an OR-gate 63 which when enabled activates divider 50 to divide the clock rate by 3.

The operation of each of the multigate arrangements of unit 52 is the same as herebefore described. The only difference is that each arrangement is supplied with the outputs of different stages of the counter 20 and the complements of such outputs in order to be able to sense the upper, middle and lower subfields of each field. It should be appreciated that simple AND, OR and Exclusive-OR gates are shown in order to explain the functions which have to be performed by units 25 and 52. However, it should be apparent that other types of logic gates, such as NAND gates, may be employed to perform the logic functions needed for the implementation of the teachings, herebefore disclosed.

There has accordingly been shown and described herein a novel digital quasi-exponential function generator. Basically it consists of a multistage counter which is clocked at a rate which is a function of the field of the count or value in the counter. That is, the count of the counter is used to control its own clocking rate. In another embodiment of the invention, each counter field is divided into several subfields and the rate of counter clocking is further controlled as a function of the particular subfields of the counter count. The relative lengths of the subfields within each field are the same regardless of field length. A single clock divider unit is needed to control the clocking rate of the counter during the various subfields of each field. In either embodiment, the initial value of the function is easily controlled by controlling the initial value in the counter 20. The time constant of the function is controlled by controlling the basic rate or frequency of the clock pulses from the source 22. By changing the basic clock rate over a wide range time constant changes over a wide dynamic range are easily obtained. Since the invention is implementable with digital circuits only, it does not suffer from the basic disadvantages of analog circuits. Furthermore, it is implementable with relatively simple and inexpensive digital circuits.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A digital quasi-exponential function generator comprising:

a multistage binary counter;

source means for supplying clock pulses to said counter to vary the count therein, the possible counts in the counter defining a sequence of fields each comprising a plurality of subfields;

control means including dividing means coupled to said source means and to said counter for sensing the field of the count in said counter and for dividing the rate at which clock pulses are supplied to said counter by a factor of two as the count changes from one field to a succeeding field in said sequence, said control means further include means for sensing in each field each of said plurality of subfields and said dividing means include means for further controlling the clock pulse rate as a function of each subfield of the sensed field count in said counter.

2. The arrangement as recited in claim 1 wherein each field includes an upper subfield comprising the top quarter of the field, a lower subfield comprising the bottom quarter of the field and a middle subfield comprising the center half of the field and said dividing means includes means for dividing the clock pulse rate by different factors during the upper, middle and lower subfields of each field.

3. The arrangement as recited in claim 2 wherein said dividing means divide said clock pulse rate by 2, 3 and 4 during the upper, middle and lower subfields, respectively, of each field.

4. A digital quasi-exponential function generator comprising;

a clockable binary counter of $n$ stages;

source means for supplying clock pulses to said counter to vary the count therein, the possible counts being in the counter defining ($n$–2) fields, the first through the ($n$–2) th field in said sequence including counts from $2^n$ to $$\frac{2^n}{2^1}, \frac{2^n}{2^1}-1 \text{ to } \frac{2^n}{2^2}, \frac{2^n}{2^2}-1 \text{ to } \frac{2^n}{2^3} \cdots \frac{2^n}{2^{n-3}}-1 \text{ to } \frac{2^n}{2^{n-2}}$$

and control means including first means coupled to the stages of said counter to sense the field of the count therein, and dividing means for controlling the rate at which the clock pulses are supplied to said counter as a function of the count field of said counter, said dividing means dividing said clock pulse rate by $2^0$, $2^1$, $2^2$...$2^{(n-4)}$, $2^{(n-3)}$ during the first through ($n$–2th fields, respectively, said control means further includes means for sensing in each sensed field each of said plurality of subfields and said dividing means include means for controlling the clock pulse rate as a function of the subfield of the sensed field count in said counter.

5. The arrangement as recited in claim 4 wherein each field includes an upper subfield comprising the top quarter of the field, a bottom subfield comprising the bottom quarter of the field, and a middle subfield comprising the center half of the field and said dividing means includes means for dividing the clock pulse rate by different increasing factors during the top, middle and bottom subfields of each field.

6. The arrangement as recited in claim 5 wherein said dividing means divide said clock pulse rate by 2, 3 and 4 during the top, middle and bottom subfield respectively of each field.

* * * * *